Oct. 5, 1926.

J. H. BULLEN 1,602,372

VALVE

Filed Oct. 26, 1925

Inventor
John H Bullen
BY Hull, Brock & West
Attys.

Patented Oct. 5, 1926.

1,602,372

UNITED STATES PATENT OFFICE.

JOHN H. BULLEN, OF OAKMONT, PENNSYLVANIA, ASSIGNOR TO THE LONG LIFE VALVE COMPANY, OF NEW KENSINGTON, PENNSYLVANIA, A CORPORATION OF OHIO.

VALVE.

Application filed October 26, 1925. Serial No. 64,927.

This invention relates to an improved valve that is especially designed for use in pumps; and it has for its objects to provide a compact valve of this character that is highly efficient; that is comparatively simple of construction and economical of manufacture and maintenance; that is very durable; wherein the parts are readily accessible for the purposes of inspection and repair, and wherein the valve proper, the only part susceptible to appreciable wear, is convenient of reversal and replacement.

Figure 1:
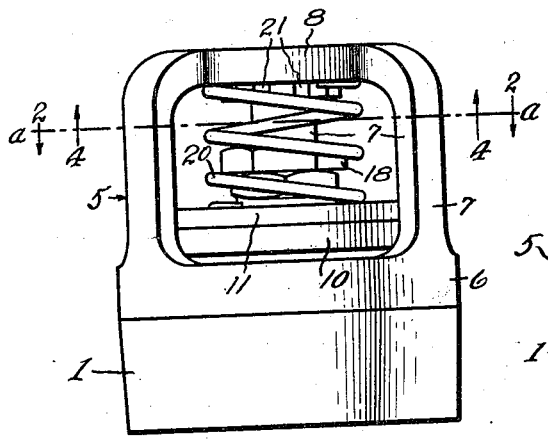
Figure 3:
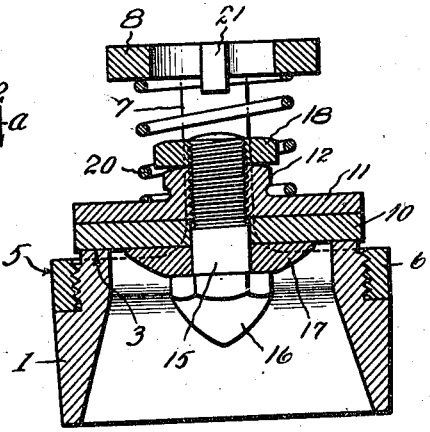
Figure 2:
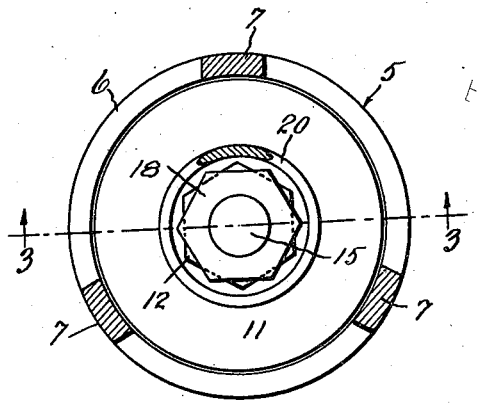
Figure 4:
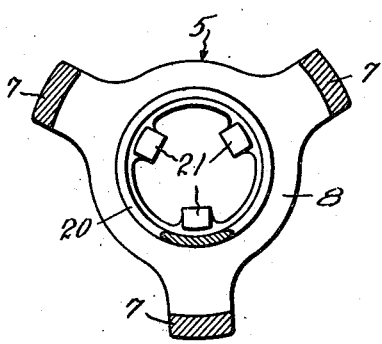

Further objects will appear as I proceed to describe my improvements by reference to the accompanying drawing wherein Fig. 1 is a side elevation of a valve constructed in accordance with my invention; Fig. 2 is a section on the line $a$—$a$ of Fig. 1, looking in the direction of the arrows designated 2; Fig. 3 is a vertical section through the valve on the line 3—3 of Fig. 2; and Fig. 4 is a section on the line $a$—$a$ of Fig. 1, looking in the direction of the arrows 4.

Describing the various parts by the use of reference numerals, 1 denotes an annular base that is adapted to be secured in any suitable manner in an opening in the deck of a pump. The base is reduced in diameter at its upper end, where it is externally threaded, and beyond the threaded portion is finished to provide a flat valve seat 3. Surmounting the base is a spider that is referred to generally by the reference numeral 5 and is comprised of a ring 6, arms 7, and a hub 8. The ring 6 is the same in external diameter as the base 1 and is internally threaded for application to the reduced threaded end of the base, and the arms 7 extend from the ring 6 in substantially parallel relation to the axis of the ring and at their ends remote from the ring are turned inwardly and merge into the hub 8.

A disk valve 10 of suitable and very durable, non-metallic composition is arranged for cooperation with the seat 3, and applied to the side of the valve opposite its seat engaging side is a metal disk 11 having a central boss 12 that is designed for the application of a wrench. The valve 10 and disk 11 are secured together by a bolt 15 having a tapered head 16 that is so shaped as to offer as little resistance as possible to the flow of liquid upwardly through the base 1. A washer 17, whose undersurface is inclined upwardly and outwardly for the same purpose as that attributed to the shape of head 16, is interposed between the head of the bolt and the valve 10. The bolt passes freely through apertures in the washer 17 and valve 10 and is threaded within a tapped hole in the disk 11. A lock nut 18 is applied to the upper end of the bolt and engages the boss 12.

A compression spring 20 is interposed between the disk 11 and the hub 18 and, at its lower end, is positioned centrally of the disk by the boss 12 and nut 18, while its upper end is maintained substantially concentric with respect to the hub 8 by lugs 21 that depend from the inner edge of the hub. These lugs also serve as stops for limiting the upward movement of the valve, the nut 18 engaging said lugs when the valve is in its extreme open position. The arms 7, by cooperation with the peripheral portions of the disk 11 and valve 10, serve as guides for maintaining the valve in correct position with respect to the seat 3.

It is apparent from the foregoing description that the valve 10 may be removed by simply unscrewing the spider 5 from the base 1 and removing the nut 18 and disk 11 from the bolt 16. The valve may then be reversed in order to present a new surface to the seat 3, or be replaced by a new valve in case the two sides have become worn through use. Also, the fact that the valve seat 3 occupies a plane that is perpendicular to the axis of the base, it is very easily ground in the first instance and may be readily maintained in perfect condition by a very simple grinding operation. Inasmuch as the valve 10 consists only of a flat piece of material cut in proper shape, it can be replaced from time to time at a minimum expense.

Having thus described my invention, what I claim is:—

In a valve of the character set forth, the combination of a base that terminates at one end in a flat seat the plane whereof is substantially perpendicular to the axis of the base, a flat disk valve of non-metallic composition arranged for cooperation with the seat, a metal disk of a diameter substantially equal to that of the valve applied to the side of the valve opposite its seat engaging side, the valve and disk having aligned apertures, the aperture of the disk being internally threaded, a bolt extending through the aperture of the valve and threaded into the aperture of the disk, a lock nut applied to the bolt beyond said disk, a spider comprised of a ring that is applied to the base and arms that extend from the ring in an axial direction and thence inwardly and merge into a hub portion that is opposed to the valve seat, said hub portion having lugs projecting in the direction of the seat, and a compression spring interposed between the hub and aforesaid disk and positioned at one end by the lock nut and at the other by the said lugs.

In testimony whereof, I hereunto affix my signature.

JOHN H. BULLEN.